United States Patent [19]
Scheuer

[11] Patent Number: 5,144,894
[45] Date of Patent: Sep. 8, 1992

[54] CONVEYING SYSTEM

[75] Inventor: Paul Scheuer, Winterthur, Switzerland

[73] Assignee: Rieter Machine Works, Ltd., Winterthur, Switzerland

[21] Appl. No.: 687,780

[22] Filed: Apr. 19, 1991

Related U.S. Application Data

[63] Continuation of Ser. No. 338,973, Apr. 14, 1989, abandoned.

[30] Foreign Application Priority Data

Apr. 14, 1988 [CH] Switzerland .................. 01378/88

[51] Int. Cl.$^5$ .............................................. B61L 27/04
[52] U.S. Cl. ...................................... 104/127; 104/88; 104/91
[58] Field of Search ............... 104/88, 91, 127, 128, 104/129, 27, 29, 30, 31, 96, 102, 137, 48, 162, 165; 19/65 R, 65 A, 65 T; 198/465.4; 57/264, 276, 277, 268, 270, 281, 299

[56] References Cited

U.S. PATENT DOCUMENTS

| | | | |
|---|---|---|---|
| 561,223 | 6/1896 | Hamilton | 104/127 |
| 1,458,881 | 6/1923 | Gromer | 104/128 |
| 1,517,707 | 12/1924 | Castleman | 104/128 |
| 2,486,222 | 10/1949 | Spafford | 104/128 |
| 2,693,770 | 11/1954 | Hubscher | 104/128 |
| 3,499,394 | 3/1970 | Lambert et al. | 104/162 |
| 3,812,786 | 5/1974 | Cahn | 104/88 |
| 3,902,427 | 9/1975 | Kastenbein | 104/88 |
| 3,905,492 | 9/1975 | Maeda et al. | 104/48 |
| 4,139,091 | 2/1979 | Busse et al. | 104/162 |
| 4,262,599 | 4/1981 | Ahr | 104/88 |
| 4,543,026 | 9/1985 | Holomen et al. | 104/48 |
| 4,597,709 | 7/1986 | Yonezawa | 104/48 |
| 4,766,547 | 8/1988 | Modery et al. | 104/88 |
| 4,807,536 | 2/1989 | Llaneza | 104/127 |

FOREIGN PATENT DOCUMENTS

| | | |
|---|---|---|
| 0092816 | 11/1983 | European Pat. Off. . |
| 2100842 | 9/1973 | Fed. Rep. of Germany . |
| 2555310 | 6/1977 | Fed. Rep. of Germany ...... 104/128 |
| 1411398 | 8/1965 | France . |
| 0002972 | 1/1977 | Japan .................................... 104/88 |
| 2195597 | 4/1988 | United Kingdom .................. 104/88 |

Primary Examiner—Robert J. Oberleitner
Assistant Examiner—Mark T. Le
Attorney, Agent, or Firm—Francis C. Hand

[57] ABSTRACT

A conveying system is provided for conveying lap rolls between different stories of a building. The conveying system includes an elevator and a transfer station on each story. A control unit controls the elevator and transfer stations independently of the operation of the machines on the two stories for the conveyance of the lap rolls as well as other intermediate products.

15 Claims, 5 Drawing Sheets

CONVEYING SYSTEM

This application is a continuation of application Ser. No. 07/338,973, filed Apr. 14, 1989, now abandoned.

This invention relates to a conveying system. More particularly, this invention relates to a conveying system for conveying products between two stages of a production line. Still more particularly, this invention relates to a conveying system for a building containing textile processing stages on different stories.

Heretofore, various types of conveying systems have been known for conveying product between the various stages of a spinning plant. For example, European Patent Application 0118600 describes a conveying system for conveying lap rolls on a single plane, that is on a single floor of a building. French Patent 1,411,398 describes an overhead rail system for conveying rolls to a series of machines. However, since space is often scarce in spinning plants which include a combing room, the various stages of a complete production line have to be accommodated on different stories or floors of the building. Frequently, the stage proceeding the combing room, that is, the combing preparation stage, is on an upper story of the building while the subsequent stage, that is, the actual combs, is on a lower story. In such cases, these types of conveying system are not suitable.

Various types of conveyor systems have also been known for conveying materials between different floors of a building employing an elevator, such as described in German Patent 21 00 842 and European Patent Application 092816. However, in such systems, no control has been effected for the movement of the materials at any particularly pace. For reasons of economics, the present practice has been to produce intermediate products of combing preparation, that is, the lap rolls, so that they are as large (heavy) as possible and to deliver them to the combers by means of conveying system with minimum manual intervention by the operatives. However, since combing is used mainly to produce better quality yarns, the intermediate products must be treated very carefully if the level of quality which the combers can provide is not to be adversely affected in the conveying system.

Further, conveying systems in a spinning plant have been subject to the normal requirements of logistics systems, particularly, to the need for a rational and orderly flow of material between the different production stages of a production line.

Accordingly, it is an object of the invention to provide a conveying system for moving product between two processing stages in a controlled manner irrespective of the operating needs of the respective stages.

It is another object of the invention to provide a simple conveying system for conveying product between textile processing stages on different floors of a building.

It is another object of the invention to provide a compact conveying system for a spinning plant which occupies a minimum of space.

Briefly, the invention provides a conveying system which is comprised of a conveyor for moving product between at least two stories of a building, a transfer station on each story of the building for the transfer of products between each respective station and the conveyor and control means for controlling the transfer of products between the stations and the conveyor.

In this respect, the conveying and transfer stations form a controlled unit which is operable in a preprogrammed sequence.

Generally, a conveyor for conveying materials between different stories of a building represents a break in the complete conveying system between two processing stages. That is, the materials cannot be conveyed between the stories as and when required but are subject to conveyor availability. Hence, it has been virtually impossible to operate such a conveyor at a predetermined cycle or pace relative to the processing stages disposed to either side of the conveyor.

The conveying system is particularly employed for the conveyance of product between two textile processing stages, each of which is located on a different story of the building.

The first transfer station for the intermediate products is provided on the upper story and the second transfer station for the intermediate products is provided on the lower story. The conveyor itself and the two transfer stations form a controlled unit which can be operated in a preprogrammed sequence independently of the pace of the machines of the two processing stages. Preferably, the controlled unit comprises a monitoring means to monitor the transfer of the intermediate products between the conveyor and the transfer stations. A control for the controlled unit can then be so programmed that conveying operations can proceed only when predetermined operating conditions of the controlled unit exist.

Preferably, reciprocating movements of the conveyor occur in substantially vertical directions whereas movements of the intermediate products between the conveyor and a transfer station and vice versa occur in substantially horizontal directions.

Carriers for the intermediate products can also be provided. In this case, the conveying system is preferably so devised that an intermediate product remains on an associated carriers from the upstream stage as far as the downstream stage—i.e., including conveyance by the reciprocating conveyor. Preferably, in this case, the conveyor is also adapted to convey empty carriers between the stories. To this end, the controlled unit can comprise transfer stations for the empty carriers on the upper and lower stories.

Preferably, the conveyor is adapted for the groupwise conveyance of intermediate products between the stories, a group of intermediate products which is to be conveyed containing a predetermined number of such products. The products of a group which are to be conveyed can be disposed in at least one row (in a set) in the conveyor. In cases in which the conveyor is adapted to convey empty carriers as well as intermediate products, the empty carriers may be arranged during conveyance in groups corresponding to the groupwise arrangement of the intermediate products in the conveyor. The system also includes a means for moving the intermediate products or empty carriers between the conveyor and the transfer stations. This means can be adapted for simultaneously moving all the intermediate products or all the empty carriers. Such means can be moved up and down between the stories with the conveyor. Preferably, the means comprise at least one guide rail fixedly disposed on the conveyor and a movable element for moving intermediate products or empty carriers along the rail. A corresponding guide rail can be disposed on each story to guide intermediate products or empty carriers between the conveyor and the particular transfer station concerned.

A guide rail of this kind represents a retaining means for the intermediate products or their carriers and a retaining means disposed on the conveyor can have a form other than a guide rail. The conveyor can be associated with a number of such retaining means, each adapted to deal either with intermediate products or with empty carriers. That is, if the retaining means are guide rails, the conveyor can be associated with at least two such rails, the first rail being adapted to carry intermediate products in one direction of conveyance while the second rail is adapted to carry empty carriers in the opposite direction of conveyance.

In practice, the conveying system comprises means for feeding intermediate products to the transfer stations of the controlled units and for removing such products from such stations. The design of such "distribution means" depends mainly upon the nature and design of the upstream and downstream working stages. In a spinning plant where the conveyor is operative between the combing preparation and the combing room, the conveyor can be associated with a single combing preparation machine but with a number of combing-room machines. Consequently, the conveyor transfer station near the combing preparation can also be effective as a transfer station for the pre-combing machine whereas additional conveying means must be provided to convey intermediate products to the combs from the delivery station near the same.

These and other objects and advantages of the invention will become more apparent from the following detailed description taken in conjunction with the accompanying drawings wherein:

FIG. 1 diagrammatically illustrates a conveying system employed in a building having two processing stages on different stories;

FIG. 2 diagrammatically illustrates the floor plan of one story of a building employing a conveying system constructed in accordance with the invention;

FIG. 3 schematically illustrates a loading position of a processing stage with a plurality of loaded carriers in accordance with the invention;

Figure 1:
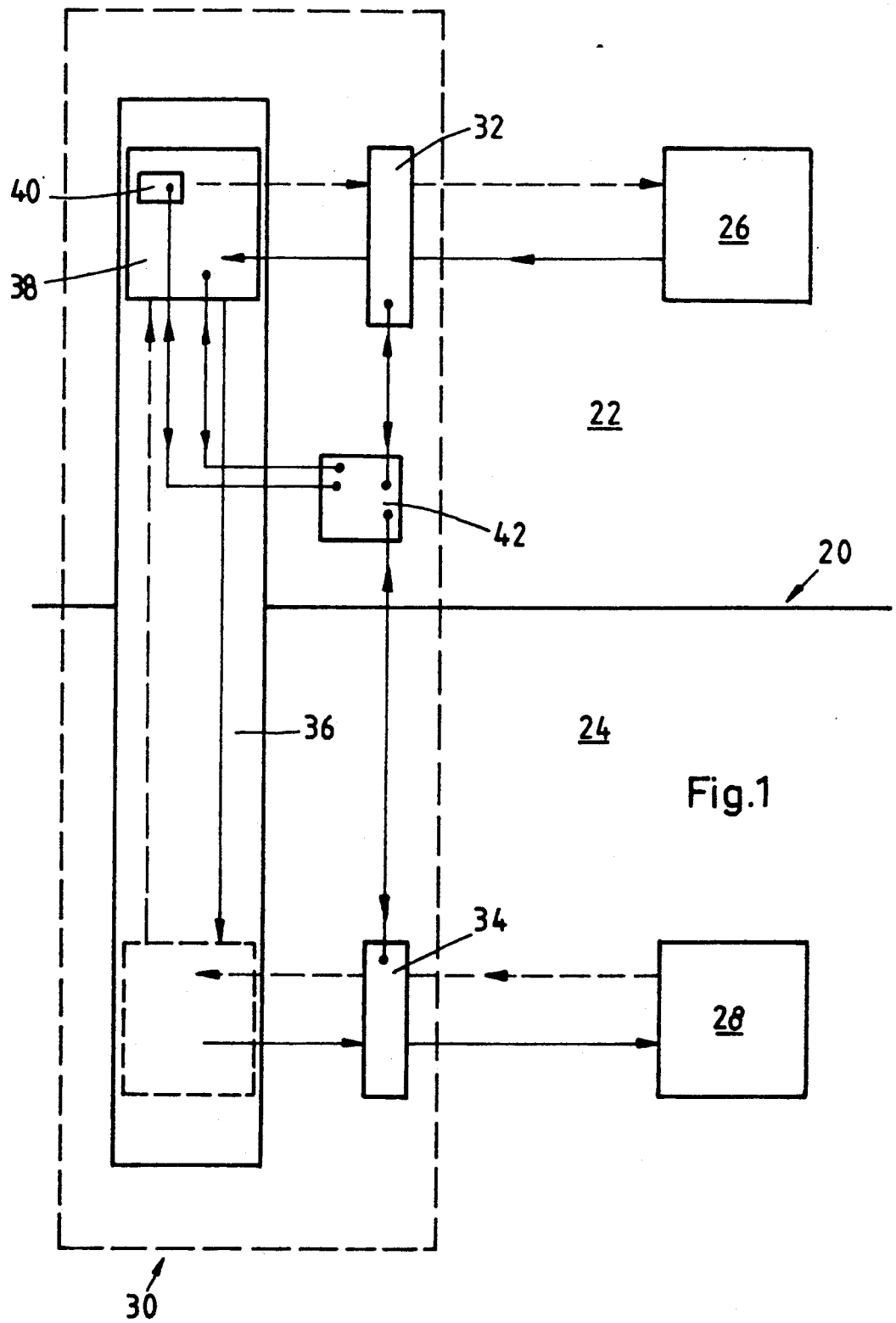

Referring to FIG. 1, a building for housing the various processing stages of a spinning plant includes an upper story 22 and a lower story 24 which are separated by a suitable boundary surface 20. As indicated, the upper story 22 supports a first textile processing stage 26 while the lower story 24 supports a second textile processing stage 28. For example, the upper stage 26 may constitute a lap-forming stage while the lower stage constitutes a plurality of combers.

As indicated, a conveying system 30 is provided for the conveyance of product between the two stages 26, 28. In this respect, the nature of the stages 26, 28 is immaterial with respect to the conveying system 30. For purposes of the illustrated embodiment, the product delivered by the processing stage 26 is to be conveyed from the upper story 22 to the lower story 24 and fed to the downstream stage 28.

The conveying system 30 comprises a transfer station 32 associated with the processing stage 26 on the upper story 22, a similar transfer station 34 associated with the downstream stage 28 on the lower story 24, a vertical shaft 36 between the two stories 22, 24 and a conveyor in the form of an elevator 38 which is movable between the two stories 22, 24 within the shaft 36.

The upper transfer station 32 is disposed for the transfer of product between the conveyor 38 and the station 32 as well as between the station 32 and the processing stage 26. Likewise, the lower transfer station 34 is disposed for the transfer of product between the conveyor 38 and the transfer station 34 and for the transfer product between the station 34 and the downstream stage 28.

The conveying system also includes a controllable means for moving products between the conveyor 38 and the respective transfer stations 32, 34 independently of the operation of the stages 26, 28. This controllable means includes a reciprocally mounted element 40 in the conveyor 38 for moving products horizontally between the conveyor 38 and the respective stations 32, 34 as well as a control 42 which is connected to the conveyor 38, stations 32, 34 and element 40 electronically via suitable electrical lines. The control 42 serves to operate the conveyor 38, element 40 and transfer stations 32, 34 in programmed sequence so as to transfer products therebetween.

Each controlled unit (station 32, station 34, conveyor 38, element 40) includes means such as sensors for monitoring the operational state of the unit and actors for performing the operations required for the particular unit concerned. The sensors transmit output signals to the control 42 which returns activating signals to the actors of the various units. The system 30 therefore operates as a unit controlled independently by the control 42 i.e., independently of the working cycles or paces of the stages 26, 28.

The vertical shaft 36 takes up very little floor space and can therefore be integrated into a spinning plant to suit the often very restricted space availability. However, the reciprocating movements of the elevator 38 represent a break in the material flow between the stages 26, 28. To overcome this, the transfer stations 32, 34 are defined as "interfaces" between the independently operating conveying system 30 and the stages 26, 28.

The solid-line arrows denote the flow of material from the upper story 22 to the lower story 24 i.e., from the stage 26 into the transfer station 32, therefrom to the conveyor 38, then down the shaft 36 to the lower story 24, then to the transfer station 34 and therefrom to the stage 28. There is normally an opposite flow of product carriers, as indicated by chain-line arrows in FIG. 1. The example shown in FIGS. 2 to 10 is so constructed that the material flow from the upper story 22 into the lower story 24 and the return flow of product carriers from the lower story to the upper story can be dealt with by the "common" conveying system 30.

Figure 2:
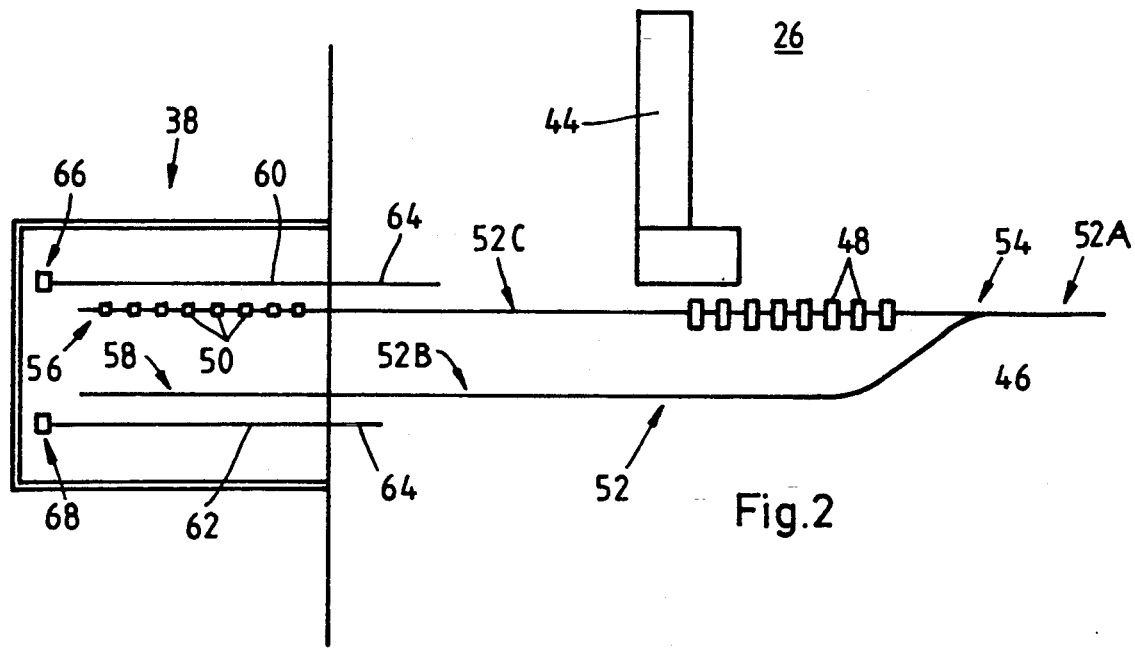

Referring to FIG. 2 the upper stage 26 comprises a single lap-forming machine 44 of a combing preparation system. This machine can be, for example, a UNILAP machine of the Maschinefabrik Rieter AG.

A diagrammatically illustrated overhead conveyor 46 (see also FIG. 3) is associated with the delivery end of the machine 44 to take over laps 48 which are formed and delivered by the machine 44. To this end, the conveyor 46 comprises grippers 50 which can be seen in FIG. 3 and which are each adapted to receive a lap 48. The transfer of the laps 48 from the machine 44 to the conveyor 46 is known and need not be further described. For example, the transfer can proceed in accordance with the system described in European Patent Application No. 118600.

In the present case, the conveyor 46 comprises a Y-shaped guide rail 52 having a switch or points 54 (FIG. 2) at the rail junction. The rail correspondingly comprises a common section 52A, a first branch section 52B and a second branch section 52C. The laps to delivered by the machine 44 are taken over directly by the grippers 50 on the second branch section 52C. Eight grippers 50 are coupled together to form a set and are moved past the machine 44 stepwise in order to take over seriatim the laps 48 delivered by the machine 44 and to form a group of eight laps 48 (FIG. 2) on the branch section 52C.

The conveyor 38 shown diagrammatically in FIG. 2 comprises a rail 56 which registers with the branch section 52C when the conveyor 38 has moved into a top "transfer position". The conveyor 38 also has a second rail 58 which registers with the branch section 52B when the conveyor 38 is in the top transfer position. A first auxiliary rail 60 is associated with the rail 56 and a second auxiliary rail 62 with the rail 58. The auxiliary rails 60, 62 extend parallel to the respective main rails 56, 58. Each auxiliary rail 60, 62 is associated with a prolongation 64 which is fixedly disposed in the story 22 and which aligns with the associated auxiliary rail 60, 62 when the conveyor 38 is in the top transfer position. The first auxiliary rail 60 carries a first reciprocating element (runner) 66 which functions as a means to transfer a set of grippers 50 from the conveyor 38 to the branch section 52C and the second auxiliary rail 62 carries a second reciprocating element 68 which functions as a means to transfer a set of grippers having laps 48 thereon from the branch section 52B to the conveyor 38.

As will now be described in greater detail with reference to FIGS. 2-7, the rail 56 is adapted to carry empty grippers 50 (FIG. 3) from the lower story 24 (FIG. 1) to the upper story 22. The rail 58 is adapted to convey lap-containing grippers 50 from the upper story 22 to the lower story 24.

FIG. 2 shows the system in a "normal position". The elevator 38 is in the top transfer position and the rail 56 carries a set of eight empty grippers 50. The rail 58 is empty—i.e., ready to take over a set of eight lap-containing grippers from the machine 44. The gripper set to be conveyed to the lower story is disposed on the branch section 52C and is moved stepwise from left to right, as viewed, so as to move the grippers 50 of the latter set seriatim through a "loading position" 70 visible in FIG. 3. The gripper 50 which happens to be in the loading position 70 takes over the next lap 48 produced by the machine 44 when the same ejects or delivers the lap. Consequently, the stepwise movement of the gripper set through the loading position 70 proceeds at the pace of the machine 44 and is controlled by a control (not shown) of the machine 44 i.e., independently of the conveying system 30.

Figure 3:
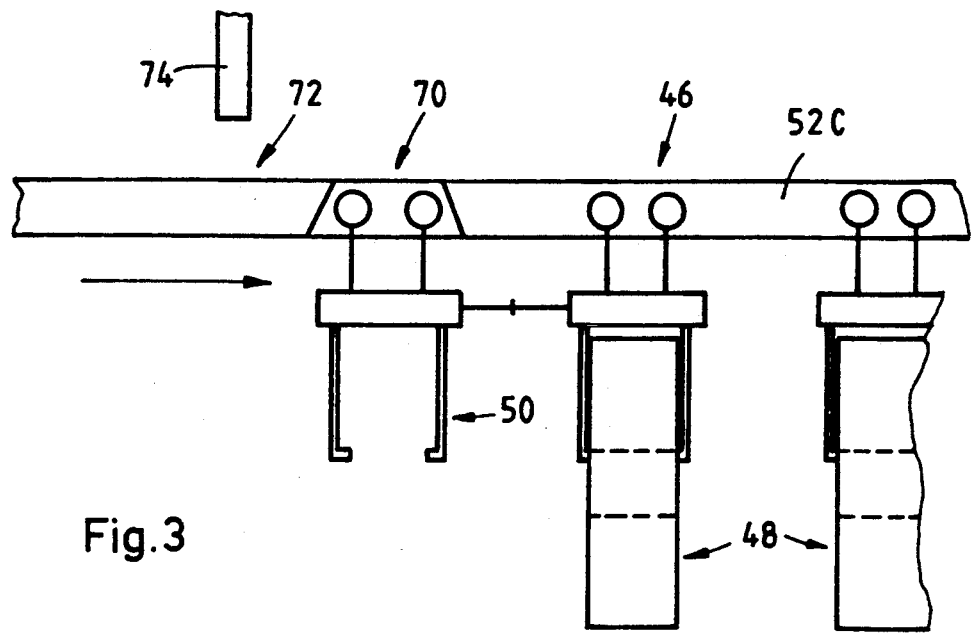
Figure 4:
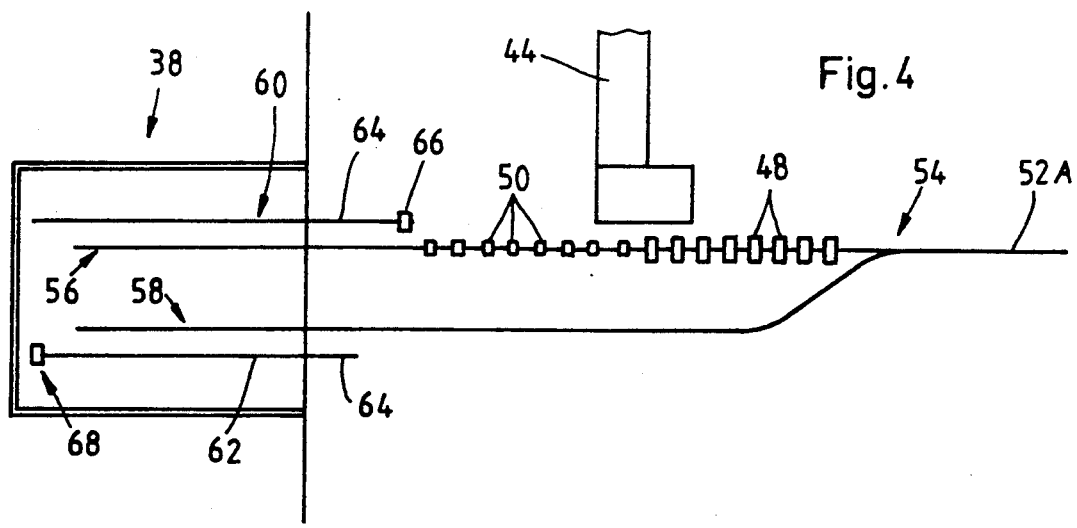
FIG. 4 illustrates a plan view similar to FIG. 2 of the carriers of the conveying system in a position astride a lap-forming machine.

As a starting point for the description of the cycle, it will be assumed that the gripper set on the branch section 52C has just taken over the seventh lap 48 of the set from the machine 44 and has been raised to rail level and the control of the stage 26 has carried out the "final" movement step of the gripper set so that an empty gripper 50 is in the loading position 70 (FIG. 3). This eighth gripper 50 of the set is ready to take over the next lap 48 to be delivered by the machine 44. However, the last-mentioned movement step of the set has "cleared" a "monitoring position" on the left of the loading position 70 i.e., a monitoring position 72 on the branch section 52C is no longer occupied by a gripper 50. An appropriate sensor 74 monitors the occupation and clearance of the position 72 and reports the state thereof to the control 42 (FIG. 1) of the conveying system 30.

When the monitoring position 72 is clear, the control 42 sends a signal to the element 66 (FIG. 2) to trigger a movement thereof from left to right as viewed along the rail 60 and the aligned prolongation 64. By virtue of an appropriate connection between the element 66 and the set of empty grippers 50 on the elevator 38, the element movement causes a corresponding movement of the empty gripper set from the rail 56 to the branch section 52C. When the element 66 has reached an end position at the right-hand end of prolongation 64 (FIG. 4), the front gripper 50 of the new gripper set is disposed in the monitoring position 72 on the branch section 52C. This state is also reported to the control 42. The element 66 therefore returns to a start position (FIG. 2) on the elevator 38 and is therefore ready for further operations to be described with reference to FIGS. 8-10.

That part of the branch section 52C which is disposed between the conveyor 38 as far as and including the monitoring position 72 therefore represents the transfer station 32 shown diagrammatically in FIG. 1. Once the conveying system 30 has delivered the empty gripper set to the station 32, the stage 26 (or the control thereof) becomes responsible for the further stepwise movement of the grippers of the latter set through the loading position 70. Such a stepwise movement of the new set can be initiated only when the last gripper 50 of the already partly loaded set has taken over a lap 48 from the machine 44 and has been raised to rail level and the readied set of laps has advanced to clear the loading position 70 for the next gripper set. This further movement of the set of laps can be effected either manually by the operatives or automatically by the control of the stage 26 through the agency of appropriate actors (not shown). The set of laps is, in any case, moved from the branch section 52C to the common section 52A, something which calls for an appropriate setting of the switch 54 to permit the stepwise movement of the new set along the branch section 52C.

If the further movement of the set of laps depends upon the operatives, there is no way of ensuring that this movement takes place immediately after readying of the set of laps. If the movement does not take place immediately, the machine 44 may nevertheless continue to operate for the time being and prepare a further lap 48 (and possibly, depending upon the design of the machine, eject such lap, in which even a second further lap can be readied in the machine itself). If the operatives have not yet advanced the set of laps to clear the loading position 70 for the new set, the machine 44 must be temporarily stopped by the control of the stage 26.

Figure 5:
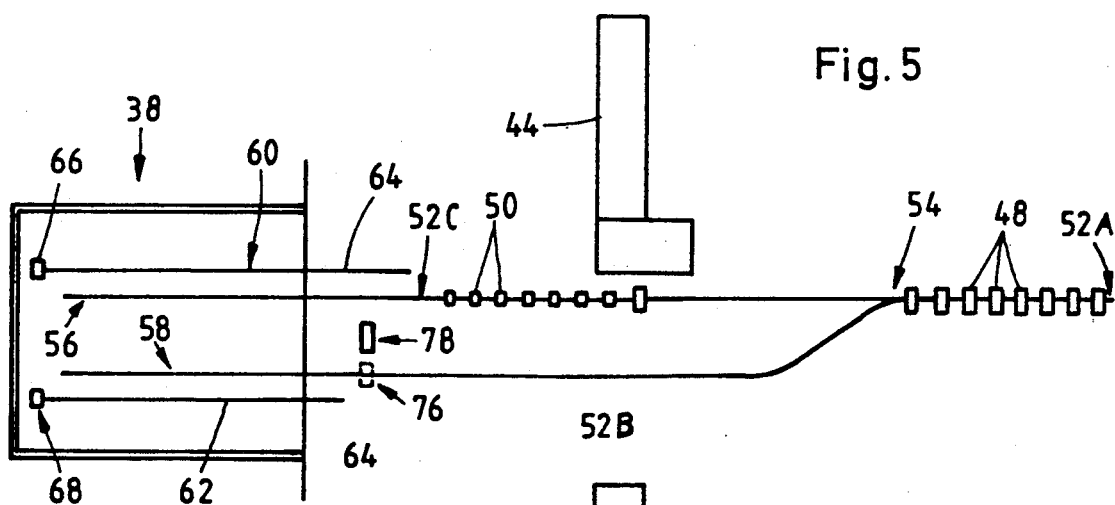
FIG. 5 illustrates a view similar to FIG. 4 with lap-loaded carriers in a position for return to the conveyor in accordance with the invention.
Figure 6:
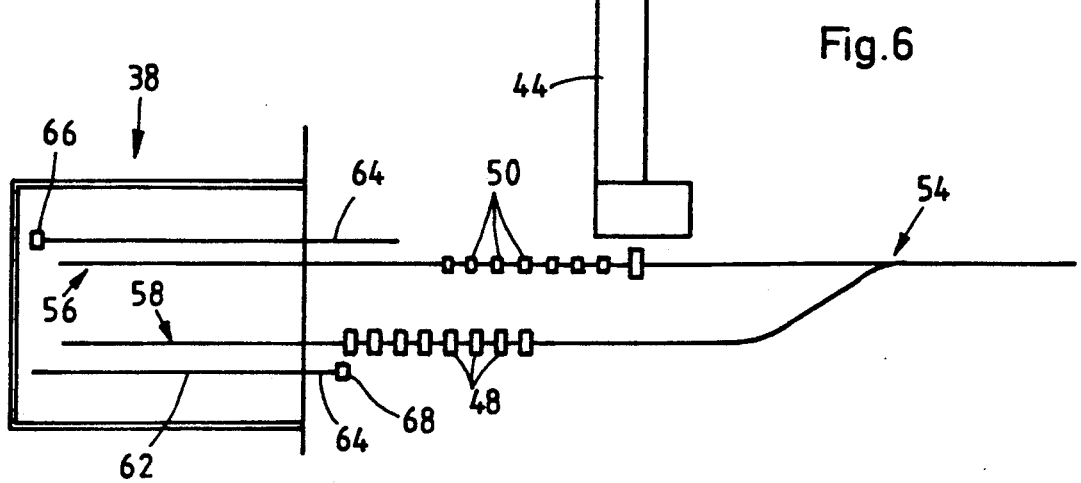
FIG. 6 illustrates a view similar to FIG. 5 with the lap-loaded carriers in a transfer position of the conveying system.
Figure 7:
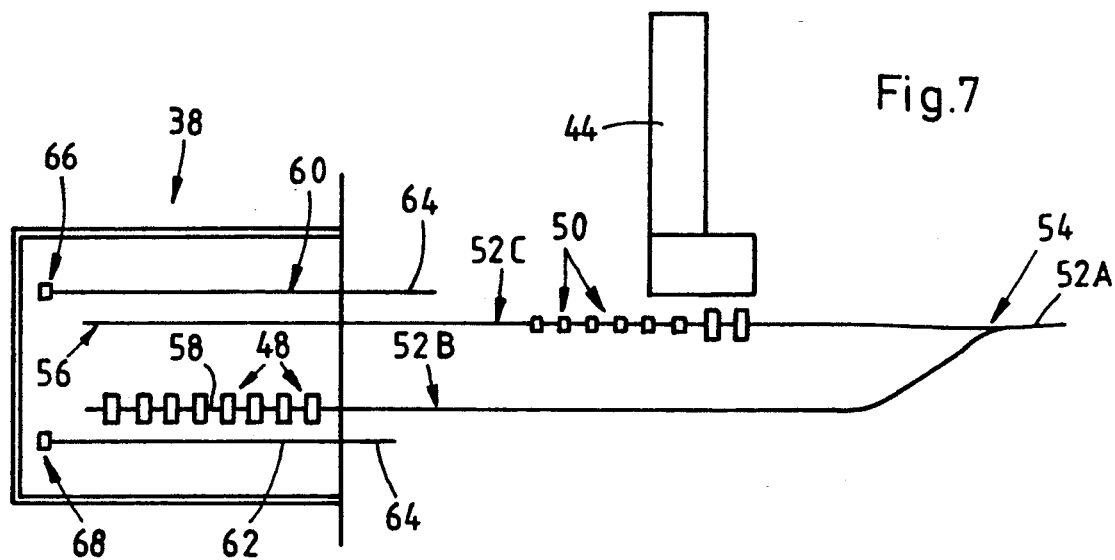
FIG. 7 illustrates a view similar to FIG. 6 with the lap-loaded carriers positioned in the conveyor in accordance with the invention.

Once the set has been moved on by the operatives, the stepwise movement of the new set through the loading position 70 can be triggered so that the new set takes the already readied lap off the machine 44 and the same is restarted. This condition is shown in FIG. 5, where the full set of laps is disposed on the common section 52A while the new set of grippers has already taken over the first lap of the new set from the machine 44. If the movements of the complete set were to be automatically controlled, the circumstances shown in FIG. 5 would not occur since the complete set would be advanced from the common section 52A to the transfer station (FIG. 1, 32) on the branch section 52B (FIG. 6) before the machine 44 could make a new lap available.

Whether the set is advanced under manual or automatic control, the switch 54 must be correspondingly reset manually or automatically in the intermediate state shown in FIG. 5 so that the set can move on to the branch section 52B. The complete set then moves therealong until the front gripper of the set arrives in a monitored position 76 shown in FIG. 5. A sensor 78 monitors the position 76 and reports the occupation thereof by the first gripper of the new set to the control 42 (FIG. 1). The control 42 then triggers a movement of the element 68 from a start position (FIG. 2) into an end position (FIG. 6) at the right-hand end of the prolongation 64 of the auxiliary rail 62. An appropriate connection is then made between the element 68 and the set of laps so that when the element 68 is returned to its start position (FIG. 7) the set of laps is drawn onto the rail 58 (FIG. 2) of the conveyor 38.

Figure 8:
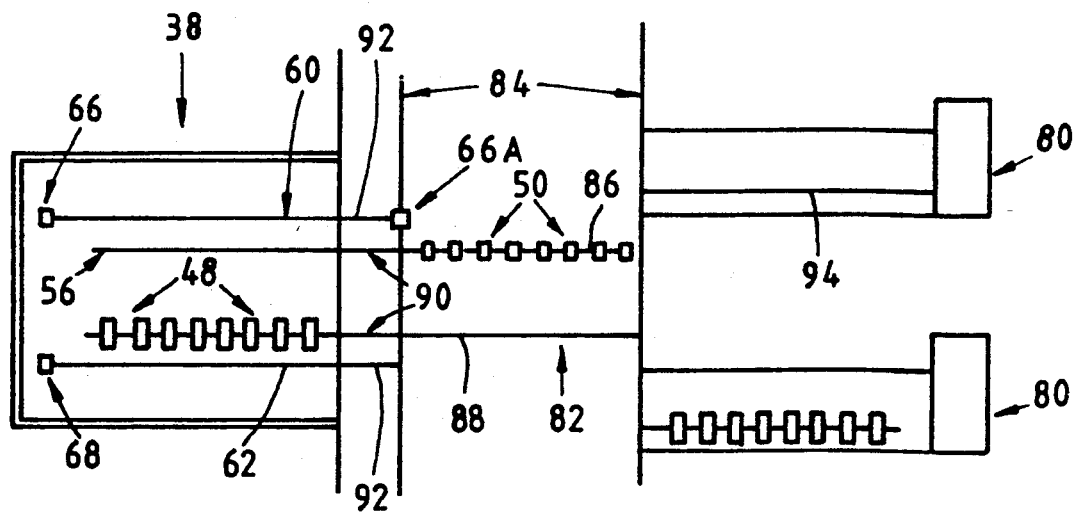
FIG. 8 illustrates a view similar to FIG. 2 of the conveying system astride a plurality of combers on a second story of a building in accordance with the invention.

The conveyor 38 descends in the shaft 36 (FIG. 1) into a "bottom transfer position", shown in FIG. 8, in the lower story 24. The previous stage 26 (combing preparation) continues to operate at its own pace and prepares a new set of laps.

The downstream stage 28 (FIG. 1) in the lower story 24 comprises, in this case a number of combers 80, only two of which are shown (FIG. 8). Each comber 80 has eight working stations each having to be fed a lap. A set of eight laps, therefore, has to be supplied to one of the combers 80.

A set of laps is supplied to a selected comber 80 by way of a traverser 82 adapted to reciprocate along a pair of rails 84 disposed along the combers 80. The traverser 82 carries two rails 86, 88 which register with the elevator rails 56, 58 when the elevator 38 is in the bottom transfer position and the traverser 82 is in a corresponding receiving position (FIG. 8). In this position, therefore, the traverser 82 represents that transfer station of the conveying system 30 which is indicated by the box 34 in FIG. 1. Rail sections 90 rigidly disposed in the story 24 connect the elevator rails 56, 58 to the traverser rails 86, 88 when the movable units have been positioned for lap transfer. Prolongations 92 of the auxiliary rail 60, 62 of the elevator 38, similar to the prolongations 64 hereinbefore described in the upper story 22, are provided in the lower story 24.

Movements of the traverser 82 along the rails 84 can proceed under either manual or automatic control. In the event of automatic control, the movements of the traverser 82 are controlled by the control of the downstream stage 28—i.e., independently of the control 42 of the conveying system 30 (FIG. 1). The traverser 82 is therefore not necessarily in the receiving position when the elevator 38 reaches the bottom transfer position. A transfer between the elevator 38 and the traverser 82 can proceed only when the traverser 82 has been locked in a receiving position and its readiness to receive has been reported to the control 42. The report thereto can be made by the operatives or by the traverser 82 itself upon its arrival in the receiving position or by an automatic control of the traverser 82.

Figure 9:
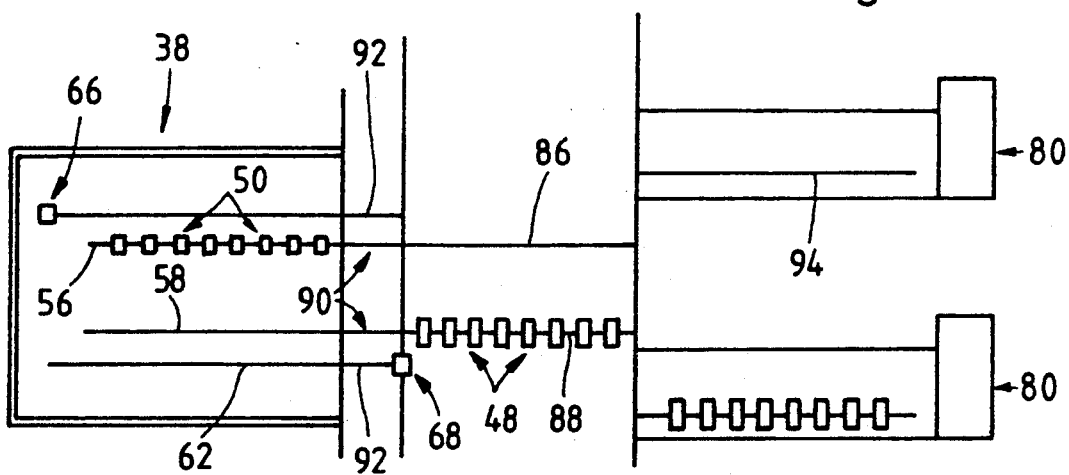
FIG. 9 illustrates a view similar to FIG. 8 with a plurality of lap-loaded carriers disposed for movement to a comber.

After receiving a traverser-ready report, the control 42 triggers a movement of the element 68 from the start position into the end position at the right-hand end of the prolongation 92 of the auxiliary rail 62. Because of the connection between the element 68 and the set of laps, the element movement produces a corresponding movement of such set from the elevator rail 58 by way of the intermediate member 90 to the traverser rail 88 (FIG. 9). The element 68 is then returned to its start position on the elevator 38. The set of laps has therefore been conveyed from the upper-story transfer station 32 (FIG. 1) to the lower-story transfer station 34 and further treatment of the set is a matter concerning not the conveying system 30 and the control 42 but the operatives or the subsequent stage 28 with its automatic control. However, a return flow from the lower story 24 to the upper story 22 is necessary and will now be briefly described.

The return flow consists at least of the empty grippers 50 which were moved previously from the upper story 22 to the lower story 24 to convey a set of laps and which, after delivery thereof to one of the combers 80, have to be returned to the upper story 22. The gripper set to be conveyed should be ready on the traverser rail 86 when the same is being locked in a receiving position. The ready-to-receive report to the control 42 is also the report that a gripper set is ready on the rail 86. The control 42 therefore initiates a movement of the element 66 from a start position into an end position 66A (FIG. 8) at the right-hand end of prolongation 92 of auxiliary rail 60. After arriving in the end position 66A, the element 66 is automatically coupled with the gripper set so that when the element 66 returns to the start position, the set is drawn by way of the intermediate member 90 from the rail 86 on to the elevator rail 56 (FIG. 9). When the elevator 38 returns to the top transfer position, the gripper set is ready for transfer to the branch section 52C (FIG. 2), as previously described.

The return flow need not necessarily consist just of empty grippers. The laps 48 are normally wound on tubes (not shown) which also have to be returned to the machine 44 in the upper story. These tubes can therefore be carried by the "empty grippers" and delivered to the machine 44 seriatim upon the arrival of the "empty gripper" at the position 72 (FIG. 3).

Figure 10:
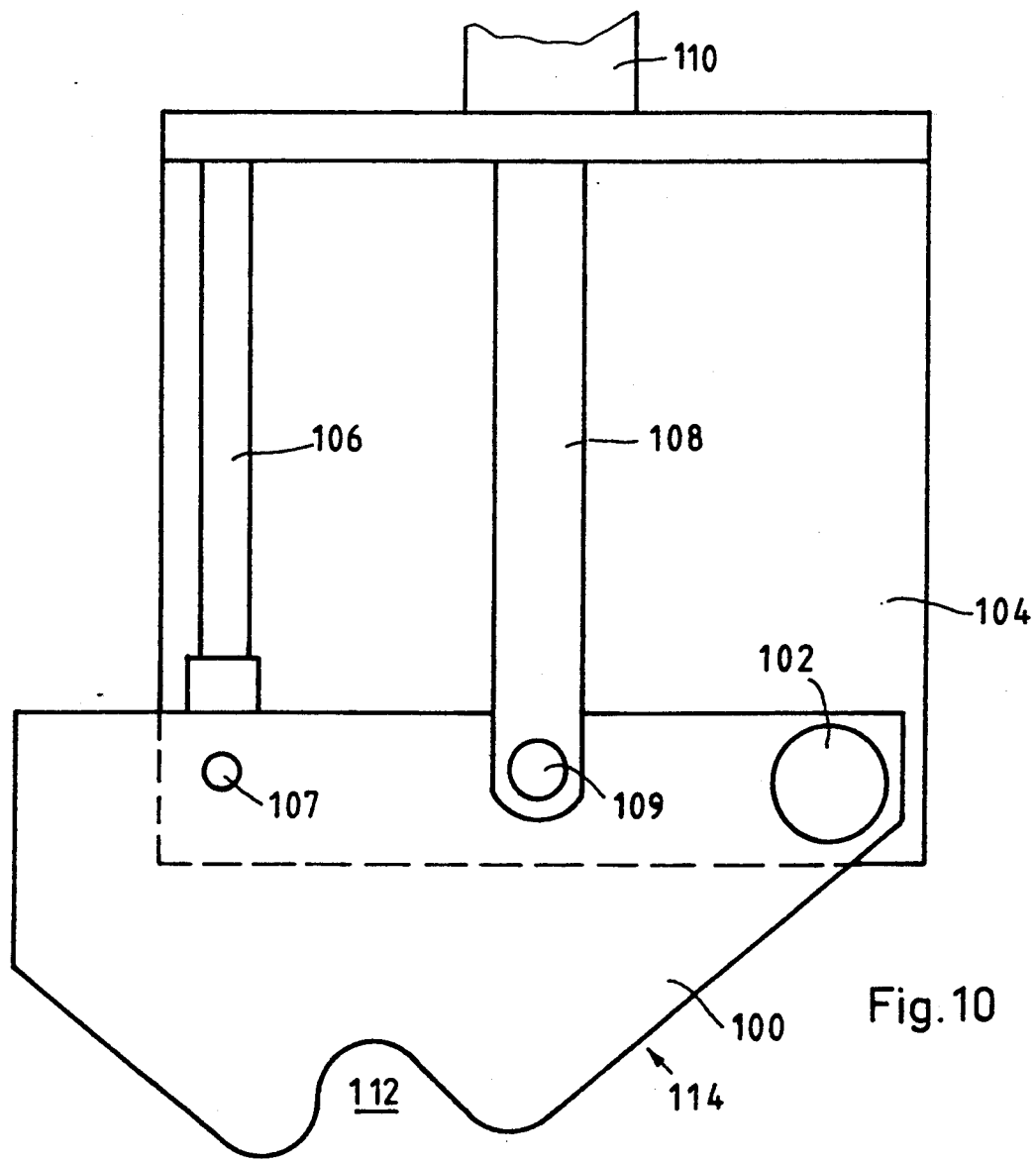
FIG. 10 illustrates a locking means for temporarily positioning products at a predetermined place in the conveyor system in accordance with the invention.

Feeding the laps of the set conveyed to the lower story 24 to a comber 80 need not be described in full detail and is readily apparent from a study of FIGS. 8 to 10.

The traverser 82 moves out of its receiving position along the rail 84 until the now empty rail 86 registers with a guide rail 94 of the selected comber 80. The gripper set which is present on the rail 94 (with the tubes carried by grippers) then proceeds from the rail 94 to the rail 86. This operation can be performed manually or automatically. The traverser 82 then moves further until the rail 88 carrying the new set of laps registers with the same guide rail 94. Thereafter, the set is moved either manually or automatically from the rail 88 onto the rail 94. The laps of the set are then delivered either manually or automatically from the grippers carrying them to the work stations of the comber 80.

The arrangement illustrated of the combers 80 is given solely as an example. Further treatment of the set of laps after delivery to the transfer station 34 (FIG. 1) can be adapted to the machinery arrangement in the lower story 24.

The "transfer stations" are defined preferably by pawls for the first unit of the set, for example, at the monitored positions 72 (FIG. 3), 76 (FIG. 5) and the corresponding places on the elevator 38 and traverser 82 (FIGS. 8 and 9).

Referring to FIG. 10, each pawl comprises a section member 100 so disposed on a carrier 104 as to be rotatable around a pivot 102. The member 100 is retained in an operative position (FIG. 10) by spring means 106 (shown only diagrammatically) which are connected to the member 100 for rotation around a pivot 107. The member 100 is formed with a recess 112 adapted to receive a cam (not shown) or the like on the first gripper of the set; however, for this purpose, the member 100 must be raised against the biasing force produced by the spring means 106, such raising being effected by the cam engaging a surface 114.

After the cam is engaged in the recess 112, the set cannot move further unless the member 100 is raised again against the biasing of the spring means 106 by a pneumatic cylinder 110 (only partly shown) acting by way of a connecting rod 108 and pivot connection 109. This release of the cam from the recess 112 occurs only when the particular control concerned outputs a corresponding signal or when the operatives operate a corresponding control.

The conveying system is not limited to the details of the examples shown. For example, the laps could be conveyed downwards individually and the groups (if required) could be formed only in the lower story 24. Empty grippers or sleeves could be returned by way of the same elevator or of a different elevator; for example, the empty grippers could be returned to the upper story 22 by a chain elevator. Since the tubes are not as delicate as the laps, the return conveyance of the tubes is not subject to the same provisions as conveyance of the laps. For example, the tubes could be placed in contiguous relationship with one another and returned to the top story 22 in an appropriate receptacle.

To ensure a lap quality and to comply with fire precautions, the elevator 38 is, with advantage, in the form of a closable box having front doors which have to be opened for conveyance between the elevator and a transfer station. The control 42 can trigger door opening and closing only when sensors report that predetermined conditions have been complied with or that predetermined circumstances exist. More particularly, the doors can stay closed until the transfer station 32 or 34 is ready to receive or deliver. The elevator 38, therefore, moves from one transfer position to the other only when the doors have been closed and this occurs only after appropriate sensors report to the control 42 that a set of laps or a set of grippers have been correctly positioned in the elevator box.

If the intermediate products to be conveyed are not as delicate as laps, the elevator 38 can be of relatively simple construction. For example, if cans with card sliver are to be conveyed between the stories, the cans themselves provide sufficient protection for the sliver and so the elevator need not be a box-like construction.

In the conveyor system disclosed by way of example, either a set of laps or a set of grippers without laps is conveyed between the stories 22, 24. Thus, the elevator 38 need not have two rails 56, 58. A single rail could be, for example, movingly disposed on the elevator 38 and be moved laterally between the reception and delivery stations to correspond with the rails 52B, 52C and 85, 88. As another variant, the elevator 38 itself could be vertically adjustable in order to move a single rail between a delivery station and a reception station, a feature which requires a corresponding arrangement of the reception and delivery rails of the transfer stations 32, 34.

As further variants, the rails of the transfer stations could be movable in order to collaborate with a single elevator rail. This is already the case with the traverser 82. If movable rails are undesirable in the combing preparation, the arrangement shown in FIG. 2 could be adapted by an additional switch or points between the machine 44 and the elevator 38.

An elevator 38 could service more than one machine in the upstream stage 26, but a corresponding distribution system would then be necessary between the transfer station 32 and the stage 26. Such distribution systems (in both stories) could comprise appropriate buffer zones in order to make the paces of the stages 26, 28 even more independent of one another and of the capacity of the conveying system.

The elevator 38 and its accessories (element 66, 68, rails 56, 58, 60, 62, etc.) can be a commercially available product, for example, a corresponding product of the Mannesmann Demag Company. This part is therefore not described in greater detail herein.

What is claimed is:

1. A conveying system for a textile building, said system comprising
    a vertically movable conveyor for moving products between two stories of the building;
    a first transfer station on one story of the building for the transfer of products between said station and said conveyor;
    a second transfer station on a second story of the building for the transfer of products between said second station and said conveyor;
    a reciprocally mounted element in said conveyor for moving products horizontally between said conveyor and a respective station; and
    a control connected to said conveyor, said stations and said element for actuating said conveyor, stations and element in programmed sequence to transfer products therebetween.

2. A system as set forth in claim 1 wherein said conveyor includes a first guide rail having said element reciprocally mounted thereon, a second guide rail parallel to said first guide rail and a plurality of carriers for product movably mounted on said second guide rail for movement therealong upon engagement with said element and each transfer station includes a guide rail for alignment with said second guide rail for transferring said carriers therebetween.

3. A system as set forth in claim 2 wherein said conveyor and said transfer stations form a controlled unit operable in a preprogrammed sequence.

4. A system as set forth in claim 2 which further comprises a monitoring means to monitor the transfer of products between said conveyor and said stations.

5. In combination
- a first textile processing stage disposed on one story of a building;
- a second textile processing stage disposed on another story of the building;
- a conveyor movable between said stories of the building;
- a first transfer station on said one story for the transfer of products between said station and said first stage;
- a second transfer station on said other story for the transfer of products between said second station and said second stage;
- a reciprocally mounted element in said conveyor for moving products horizontally between said conveyor and a respective station; and
- a control connected to said conveyor, said stations and said element for actuating said conveyor, stations and element in programmed sequence to transfer products therebetween.

6. The combination as set forth in claim 5 wherein said first stage includes at least one lap-forming machine and said second stage includes at least one comber.

7. The combination as set forth in claim 5 wherein said conveyor includes a first guide rail having said element reciprocally mounted thereon, a second guide rail parallel to said first guide rail and a plurality of carriers for product movably mounted on said second guide rail for movement therealong upon engagement with said element and each transfer station includes a guide rail for alignment with said second guide rail for transferring said carriers therebetween.

8. The combination as set forth in claim 7 wherein each transfer station includes a second guide rail for alignment with said second guide rail of said conveyor for movement of said element therebetween.

9. The combination as set forth in claim 8 which further comprises a guide rail extending from said first transfer station to a position astride said first processing stage to convey said carriers between said first transfer station and said first processing stage.

10. The combination as set forth in claim 9 wherein said guide rail extending from said first transfer station is Y-shaped with a pair of parallel branches and a common branch, one of said parallel branches extending from said first station to said first stage to deliver said carriers thereto and a second of said parallel branches extending from said first stage to said first station to return said carriers thereto.

11. The combination as set forth in claim 10 wherein said conveyor includes a third guide rail parallel to said second guide rail thereof to receive returned carriers, a fourth guide rail parallel to said third rail and a second element reciprocally mounted thereon for transferring carriers from said first stage into said conveyor.

12. The combination as set forth in claim 9 which further comprises a monitoring means at said first stage for monitoring the presence of a carrier at a predetermined loading position of said first stage.

13. The combination as set forth in claim 12 wherein said first stage includes at least one lap-forming machine.

14. The combination as set forth in claim 8 which further comprises a traverser having said second guide rail of said second transfer station therein, and a pair of rails having said traverser mounted thereon for movement to said second stage.

15. The combination as set forth in claim 14 wherein said second stage includes a plurality of combers.

* * * * *